(12) United States Patent
McCuller

(10) Patent No.: US 7,921,078 B2
(45) Date of Patent: Apr. 5, 2011

(54) SYSTEM FOR NEGOTIATED DIFFERENTIAL COMPRESSION

(75) Inventor: Patrick McCuller, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 288 days.

(21) Appl. No.: 11/111,083

(22) Filed: Apr. 20, 2005

(65) Prior Publication Data

US 2006/0242157 A1 Oct. 26, 2006

(51) Int. Cl.
*G06F 17/00* (2006.01)
*G06F 7/00* (2006.01)

(52) U.S. Cl. ......... 707/625; 707/693; 717/170; 717/173
(58) Field of Classification Search .................. 707/609, 707/795
See application file for complete search history.

(56) References Cited

U.S. PATENT DOCUMENTS

| | | | |
|---|---|---|---|
| 6,430,685 B1 * | 8/2002 | Yu et al. ............................ | 713/1 |
| 6,493,871 B1 * | 12/2002 | Welch et al. .................. | 717/173 |
| 2002/0099726 A1 * | 7/2002 | Crudele et al. ................ | 707/200 |
| 2002/0188940 A1 * | 12/2002 | Breckner et al. .............. | 717/175 |
| 2004/0031028 A1 * | 2/2004 | Hunt et al. ..................... | 717/170 |
| 2004/0062130 A1 * | 4/2004 | Chiang .................... | 365/230.03 |
| 2004/0215755 A1 * | 10/2004 | O'Neill ......................... | 709/223 |
| 2005/0022175 A1 * | 1/2005 | Sliger et al. ................... | 717/169 |
| 2006/0112152 A1 * | 5/2006 | Napier et al. ................. | 707/203 |

OTHER PUBLICATIONS

Shapira, D. and J.A. Storer "In Place Differential File Compression", The Computer Journal, vol. 48, No. 6, 2005, pp. 677-691.*
Jaffri, T. and K. Karnawat "Efficient Delivery of Software Updates Using Advanced Compression Techniques", Proceedings of the 22nd IEEE International Conference on Software Maintenance (ICSM '06), 2006.*

* cited by examiner

*Primary Examiner* — Luke S Wassum
(74) *Attorney, Agent, or Firm* — Samuel S. Lee; Procopio, Corey, Hargreaves & Savitch LLP

(57) ABSTRACT

A system and methods for distributing a new file from a server connected through a network to a client. Rather than downloading an entirely new file from the server, the system makes use of reference files already resident on the client. A new delta file corresponding to a reference file is sent to the client. The client generates the new file by modifying the corresponding reference file according to the change instructions in the new delta file.

28 Claims, 4 Drawing Sheets

SYSTEM FOR NEGOTIATED DIFFERENTIAL COMPRESSION

BACKGROUND

The downloading of software/data files and updates to those files over a network can be bandwidth intensive. For example, in the realm of massively multiplayer online gaming (MMOG), large files are regularly distributed and updated over the Internet to millions of online users. These file distributions not only take time to effect, which interrupts the user's experience, but they also require tremendous bandwidth, which can be expensive for all parties involved. Therefore, a need exists for a method of efficiently distributing such files to the user.

FIG. 1 shows a conventional configuration of an online game system (e.g. for an online role-playing game) operated by an online service company (operator) 120. The online game system includes one or more system servers 100 connected to a network 130 (e.g. Internet connections). The system servers operate to provide a game environment to clients (users) 140 logged into the system through the network. The system servers are connected to one or more databases 110 which store game related data files, typically representing user information and game items. These databases also store files for updating the software for executing game play. The user (i.e. a player of the game) executes game software on a computer system (e.g., a desktop personal computer) using a network connection opened to the game system.

Periodically, the online service company makes changes to the game and uses the game system to distribute these changes (or updates) to the game software resident on the users' computer systems. From the player's perspective, this process involves the player downloading updates to the game software from the system servers onto his/her client computer. This update process usually involves downloading a set of download files. The game software typically includes multiple file types; including data files, executable files, and processed data files (e.g., audio, images, and video). Download files can include any of these types. Further, download files may include new files which have not been previously downloaded to the client and/or new versions (i.e. updates) of previously existing files.

As mentioned above, the size and number of files which need to be downloaded creates a significant bandwidth problem. Therefore, a need exists for techniques which reduce the amount of data which needs to be sent in these downloads.

To address this problem, online service companies may employ a differential compression technique to reduce the amount of data which needs to be sent. When a new version of an existing file is created, the game system may create a delta file. A delta file is a differential file indicating the changes which need to be made to update an existing file. The delta file includes computer instructions on how to modify the previous version of the corresponding file to match the intended new version of the file. Note that a delta file can also include cumulative changes, reflecting a series of updates. Typically, the changes comprising the delta file are much smaller than the size of the complete new version file. This compression technique is particularly effective when the changes are small relative to the overall size of the existing file. Accordingly, the size of the download files can be reduced by substituting much smaller delta files for the larger, new versions of existing files.

Note this "differential compression" technique should not be confused with standard data compression techniques in which an entire file is compressed. For example, several online service companies currently save bandwidth by compressing new files (and delta files) using various lossless compression techniques designed for data files. Irrespective of data compression, online service companies still often send new files in their entirety. Therefore, a need still exists to reduce the amount of data which needs to be sent (or compressed) for new files.

SUMMARY

The present invention provides methods and a system for distributing a new file from a server connected through a network to a client. Rather than downloading an entirely new file from the server, the system makes use of one or more reference files already resident on the client. A new delta file corresponding to a reference file is sent to the client. The client generates the new file by modifying a copy of the corresponding reference file according to the change instructions in the new delta file.

One implementation is a method of distributing a new file from a server to a client. In this method, the client receives a reference delta index corresponding to the new file from the server. The reference delta index comprises a list of one or more new delta files and corresponding reference files for the new file. A new delta file and corresponding reference file is selected based on a reference file list of one or more reference files resident on the client. The selected new delta file is obtained from the server and the new file is generated on the basis of the new delta file from the server and corresponding reference file from the client.

Other aspects of this implementation include that the client may perform a step of generating the reference file list of one or more reference files. In addition, the client may also obtain a new file list of one or more new files for distribution from the server, determine a new file from the new file list to download from the server, and request the new file from the server. The reference delta index may also include compression values for the new delta files and the new delta file may be selected on the basis of these compression values. The new file is preferably generated by modifying a copy of the corresponding reference file according to the new delta file. The new delta file may be comprised of instructions for changing the corresponding reference file into the new file. Reference files may be provided beforehand to the client using a physical media. The server may be for an online game system and the reference files may include base files not provided as part of the online game system.

Another implementation is a method of distributing a new file from a server to a client. The server selects reference files from a reference file database connected to the server. New delta files are generated corresponding to the selected reference files for the new file. The server generates a reference delta index for the new file. The reference delta index comprises a list of one or more new delta files and corresponding reference files. At least one of the new delta files is sent to the client on the basis of the reference delta index. The new delta file is used by the client to generate the new file.

Other aspects of this second implementation include that the client may perform the steps of sending the reference delta index to the client in response to a new file request for the new file, and sending at least one new delta file to the client in response to a new delta file request from the client. The server may select reference files based on a reference file list of reference files on the client. The server may also obtain a new file list of new files needed by the client and determine the new file which needs to be downloaded to the client from the new file list. Compression values may be calculated for the generated new delta files and included in the reference delta index. These compression values may be compression ratios for the new delta files from the new file. The new delta file may be comprised of instructions for changing the corresponding reference file into the new file (e.g., according to a pre-established algorithm for delta files). Reference files may be provided beforehand to the client using a physical media. The server may be for an online game system and the reference files may include base files not provided as part of the online game system.

Still another implementation is a system for distributing a new file from a server connected through a network to a client. The server selects reference files from a reference file database connected to the server, generates new delta files corresponding to the selected reference files for the new file, and generates a reference delta index for the new file. The reference delta index is comprised of a list of one or more new delta files and corresponding reference files. The client receives the reference delta index corresponding to the new file from the server, selects a new delta file and corresponding reference file based on a reference file list of reference files resident on the client, obtains the selected new delta file from the server, and generates the new file on the basis of the new delta file from the server and corresponding reference file from the client.

Other aspects of this third implementation include that the client may perform a step of generating the reference file list of reference files. The client may obtain a new file list of new files for distribution from the server, determine the new file from the new file list to download from the server, and request the new file from the server. The server may also calculate compression values for the generated new delta files and include the compression values in the reference delta index. The server may send the reference delta index to the client in response to a new file request for the new file, and send the at least one new delta file to the client in response to a new delta file request from the client. The server may select reference files based on the reference file list of reference files on the client. The server may obtain a new file list of new files needed by the client and determine the new file which needs to be downloaded to the client from the new file list. The client may select the new delta file base on the compression values in the reference delta index. The compression values may be compression ratios for the new delta files from the new file. The new delta file may be comprised of instructions for changing the corresponding reference file into the new file. Reference files may be provided beforehand to the client using a physical media. The server may be for an online game system and the reference files may include base files not provided as part of the online game system.

DETAILED DESCRIPTION

Figure 1:
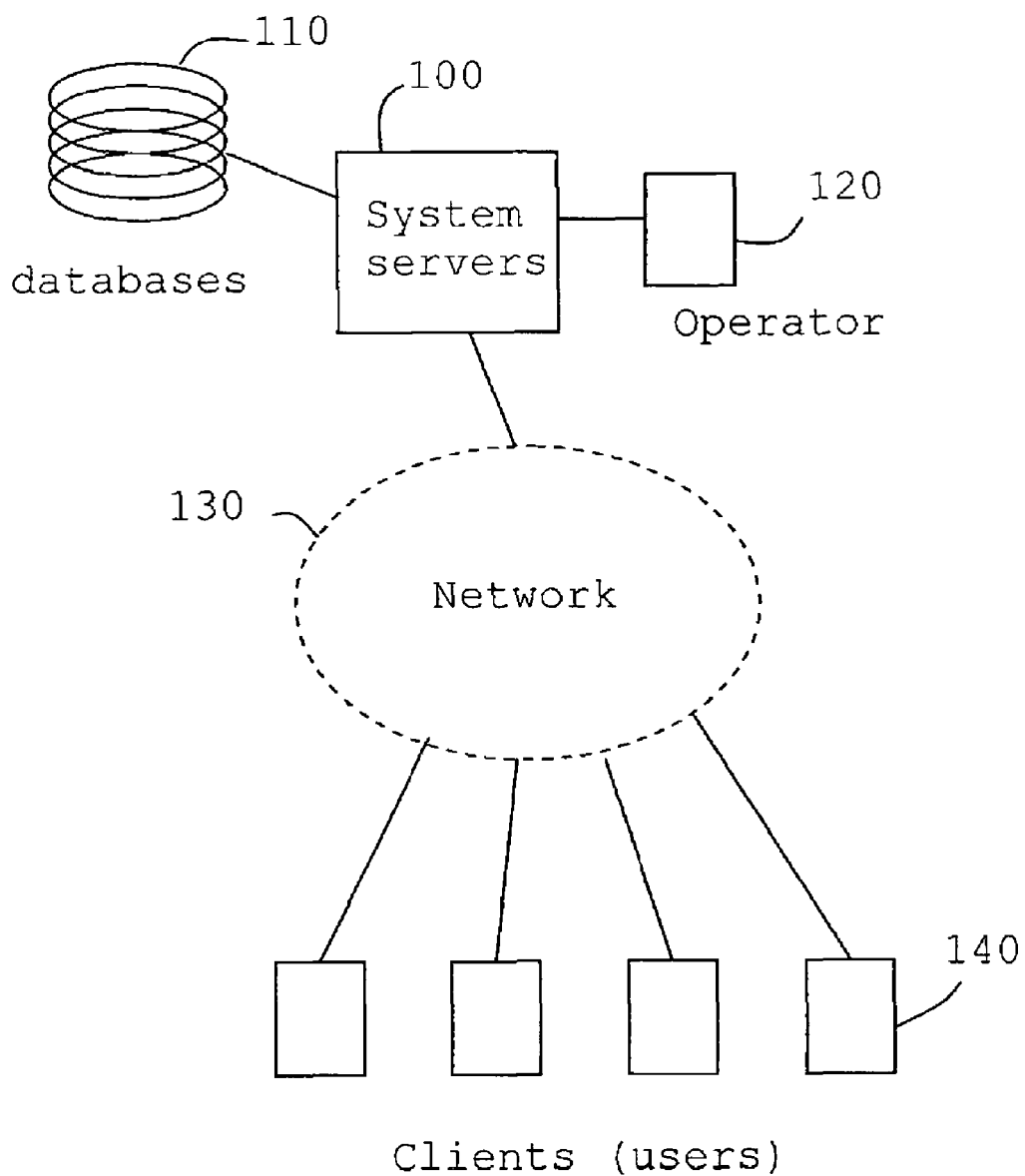
FIG. 1 shows a conventional configuration of an online game system.

As discussed previously, two groups of download files that are distributed to clients are: updated versions of existing files that users already possess and entirely new files. Updated versions are distributed via delta files, each of which includes a list of changes to previous versions of an existing file. Software on the client computer sequentially applies these changes to the pre-existing file to modify or "transform" it into the updated file.

The present invention is directed to a technique of negotiated differential compression which applies the differential compression technique of delta files to new files to be downloaded. By representing a new file as though it were a revision of an existing file, usually a system or library file, an entirely new file can be transferred from server to client using fewer "bits on the wire." This effectively improves the compression ratio. A variation of this might include applying a sequence of delta files, thereby effectively applying a delta of a delta file.

An illustrative example describing one implementation is presented below. This example is not exhaustive and additional implementations, examples, and variations are also described later.

When an online game system creates an entirely new file, the system could compress the new file and send the compressed file to users. However, it can be costly to send a complete (compressed or uncompressed) copy of the new file to every user. Accordingly, the present system uses delta files as one way to distribute new files (as well as updated files). With delta files for new versions of existing files, the user already has a copy of the old version of the file. But, for an entirely new file there is no corresponding previous version which can be used as the basis for a delta file. Instead, the game system builds new (or "extrinsic") delta files based on reference files that are not part of the game software (where an "intrinsic" delta file is based on a file that is part of the game software).

The game system selects a set of reference files that the online service company determines are likely to be present on many users' computer systems. For example, if a particular type of operating system software or component software is needed to execute the game software, the company can assume that users of the game software should have the data files associated with that software stored in their computer systems (e.g., system, graphics, and library files). The company can also select other types of reference files, such as common application program files or utility program files, or files for different software published by the same company (e.g., for another game).

The system server of the game system creates a set of new delta files for each new file. Each new delta file includes instructions for transforming a corresponding reference file into the new file. Hence, a computer system that has the new delta file and the corresponding reference file can build a copy of the new file without receiving the entire new file directly from the game system. Of course, some reference files are easier to transform into a new file than others.

To determine which reference files will be suitable to transform, the system server also creates a reference delta index for the new file. The reference delta index is a table which includes an index entry for each new delta file built for the new file. An index entry indicates the new delta file (e.g., by name and/or path), a corresponding reference file, and a compression value or ratio for the new delta file (e.g., size of the new delta file divided by size of the new file). The game system updates the reference delta index as new delta files are created.

In one example of interaction between the game system and a user's computer system, the client opens a connection to the game system and sends a query for a list of new files or updates. If the client determines that an update of an existing file is available, the client sends a request for the corresponding (intrinsic) delta file. The client stores and then applies the delta file to modify the corresponding existing file stored in the user system.

If the client determines that a new file is available, the client sends a request for the new file and receives back the reference delta index for that new file. Alternatively, the client may directly request the reference delta index for the new file. The client searches the delta index for index entries corresponding to reference files that are stored in storage accessible to the client (e.g., local storage such as a hard disk or remote storage such as a network server). The client selects from among the index entries a new delta file corresponding to one or more available reference files and having a favorable compression ratio. The client then sends a request to the game system for the selected new delta file. The client stores and applies the new delta file to the corresponding reference file to generate a copy of the new data file. (Other implementations can use different sequences of requests; for example, the game system can query the client to determine which reference files are available and then the game system can select the new delta file to download to the client.)

In this example, an online service company uses new delta files based on reference files outside the game software files to let client systems recreate files stored on the company's system. For new files that are large and have certain similarities with common extrinsic files (such as operating system files), instead of downloading the large data file itself, the client downloads the smaller delta file. This technique allows the company to provide users with access to the content of new files and reduce the cost of data downloads.

The present invention will now be described in more detail by reference to the drawings.

Figure 2:
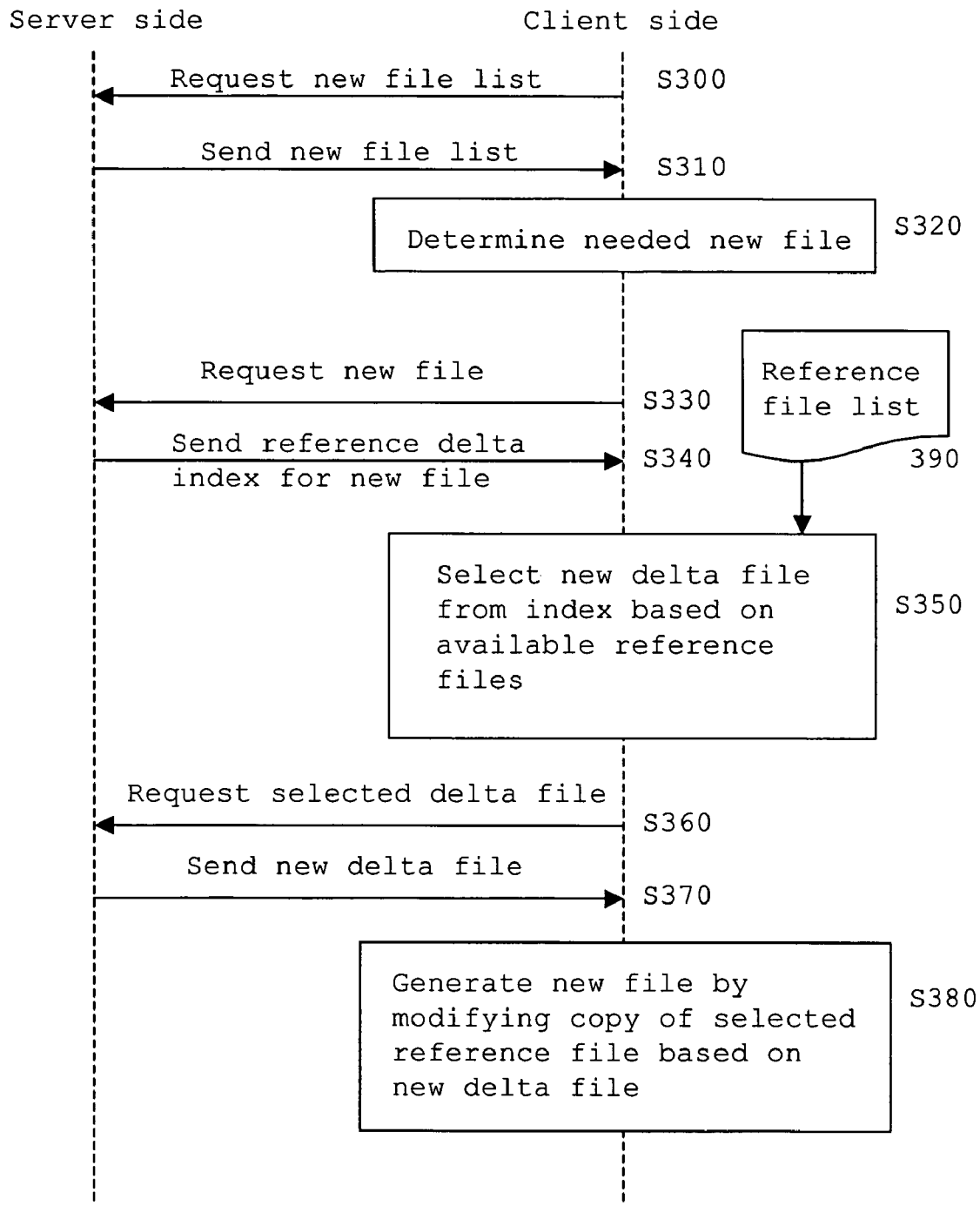
FIG. 2 shows the stepped interactions between a client and a server in generating a new file in accordance with the teachings of the present invention.

FIG. 2 shows the stepped interactions in one implementation between a client and a server in generating a new file. This interaction is applicable to a network configuration similar to that shown in FIG. 1, where the server and client are network computer systems (possibly including multiple subsystems) storing and executing server and client game software, respectively, to perform these operations. The client may initiate a download of update files by requesting a new file list from the server. (S300) In response, the server sends the new file list to the client. (S310) The client reviews the new file list and determines whether there are any new files it needs to download. (S320) The client then indicates to the server that it requires a new file, and/or requests a reference delta file index. (S330) Rather than send the new file directly to the client, the server sends a reference delta index corresponding to the new file to the client. (S340) The reference delta index is a list of new delta files, corresponding reference files, and compression values. The client can then select a new delta file from the reference delta index based on the listed compression values and by referring to a reference file list 390 of reference files available to the client. (S350) The reference file list can be a previously generated list or be newly generated by the client. Alternatively, the client could search for reference files based on the index entries in the reference delta index. In another implementation, the server searches the client for reference files (or causes the client to search). The reference file search results could also be used to generate the reference file list. The client requests the selected new delta file from the server. (S360) In response, the server sends the new delta file to the client. (S370) Hence, the server has sent the new delta file and reference delta index to the client instead of the entire new file. Depending on the compression value of the new delta file, this may represent a significant reduction in the size of the file representing the data which is being transferred. The client can now generate the new file by modifying a copy of the selected reference file based on the received new delta file. (S380)

Alternatively, in step S360, the client may simply request the entire new file be sent rather than a new delta file. This alternative would be applicable if, for example, there is no available reference file listed in the index.

Figure 3:
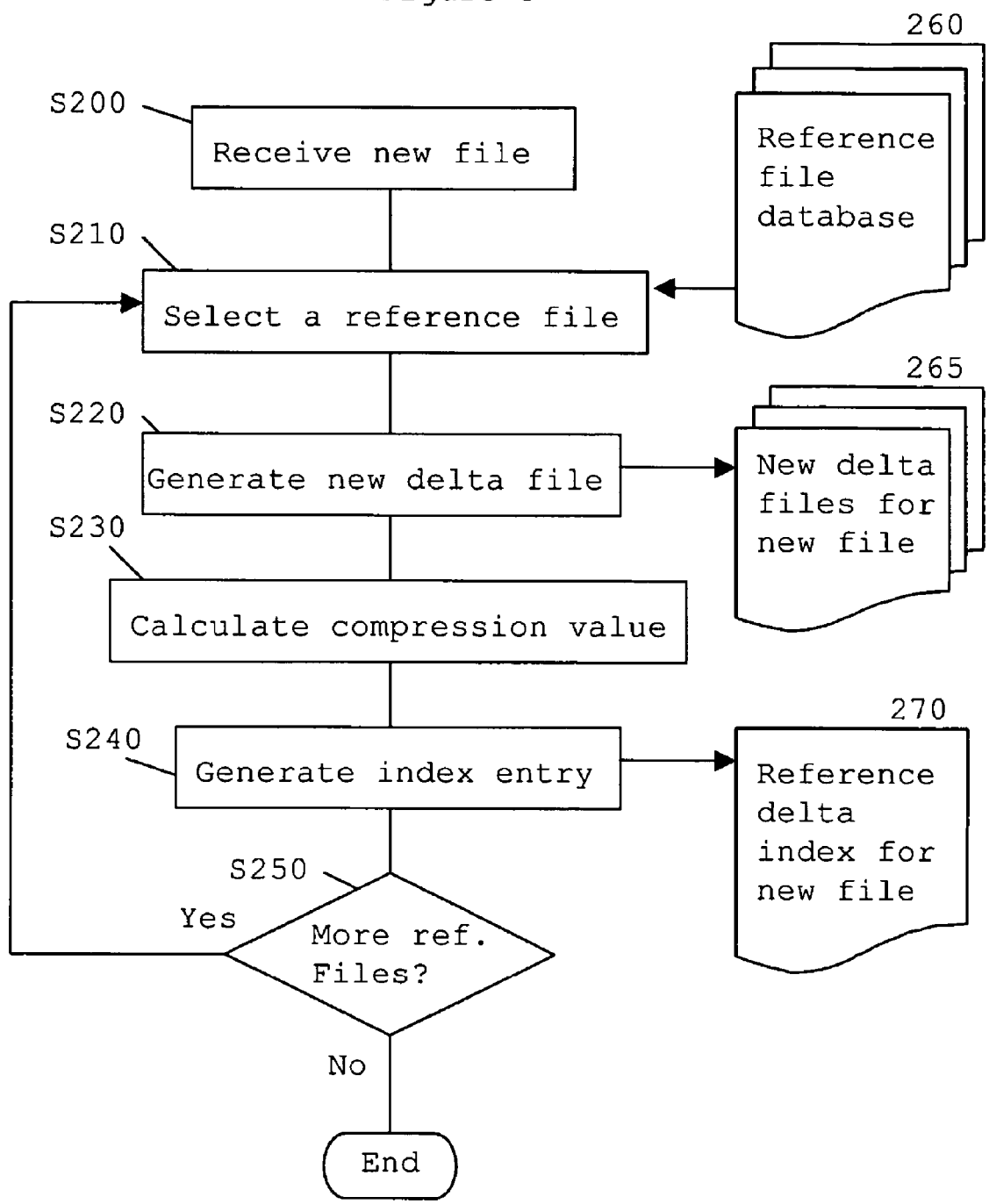
FIG. 3 is a flowchart showing the steps performed by a server in preparing delta files and a reference delta index for a new file in accordance with the teachings of the present invention.

FIG. 3 is a flowchart showing the steps performed in one implementation by a server in preparing delta files and a reference delta index for a new file. The online service company (i.e. an operator) provides a new file, typically as part of a set of download files, to the system server for downloading to users of the system. (S200) Rather than download the new file, the server prepares a set of new delta files which can be selected from to download instead of the new file. To this end, the server selects a reference file from a connected reference file database 260. (S210) The selected reference file is compared to the new file to generate a new delta file 265 containing instructions for transforming the reference file into the new file. (S220) A compression value is calculated for the new delta file. (S230) The compression value is some measure of the reduction in file size between the new delta file and the new file being replaced in the download, such as the reduction in file size or compression ratio. An index entry is generated for the new delta file in the reference delta index 270 corresponding to the new file. (S240) The index entry identifies at least the new delta file, the corresponding reference file, and the compression value. In another implementation, the index entries may not indicate a compression value; in which case the client may simply select the first reference file match. Alternatively, the index entries include different or additional information to facilitate selecting a delta file, such as the size of delta files. The server then determines whether additional reference files should be selected. (S250) In this manner, the server prepares new delta files and a reference delta index for the new file. The reference delta index may also include an entry for the entire new file (possibly in one of various compressed formats) as a comparison or in the event the client has no appropriate reference files. This process is preferably performed before the client requests a new file. Alternatively, the server may process all reference files or continuously update the index as new reference files are made available. Preferably, the current reference delta index or a delta from an earlier reference delta index is sent to the client. Optionally, the reference delta index may be sent in compressed format.

Figure 4:
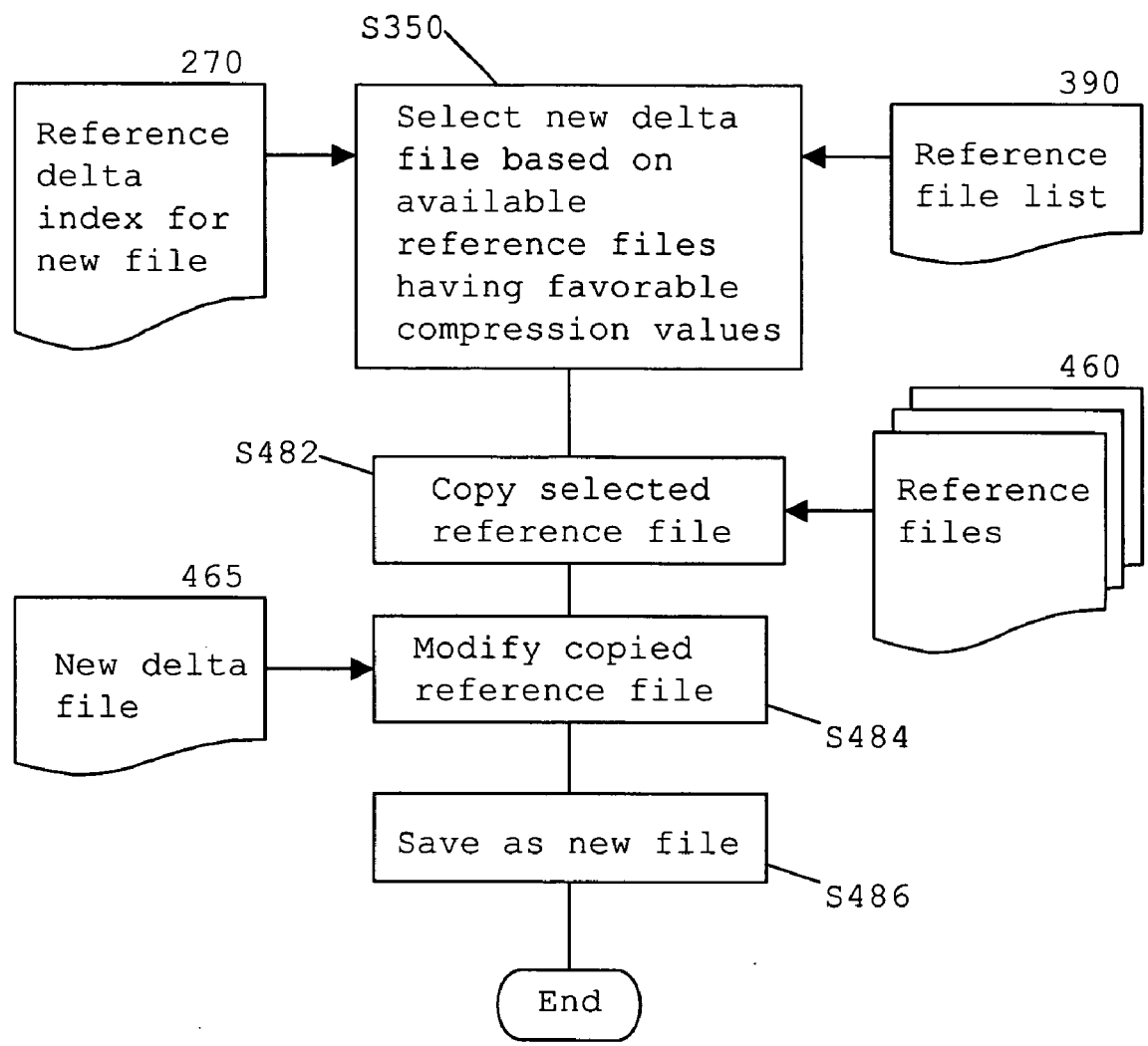
FIG. 4 is a flowchart showing the steps performed by a client in generating a new file based on a new delta file in accordance with the teachings of the present invention.

FIG. 4 is a flowchart showing the steps performed in one implementation by a client in generating a new file based on a new delta file in accordance with the teachings of the present invention. Upon receipt of the reference delta index 270 for a requested new file, the client selects a new delta file based on its corresponding reference file from amongst the available reference files 460 listed in the reference file list 390. (S350) This selection is preferably based on favorable compression values listed in the index entries of the reference delta index. A copy of the selected reference file is then made. (S482) Typically, the reference file list will contain the locations or paths of the reference files 460 in the client. Alternatively, the client may have a reference file database for storing the reference files. Note, such a database, upon which the reference file list 390 would be based, would be different than the server's reference file database 260. Presumably, there is an adequate degree of overlap between the reference files at the server and at the client so that the invention can be efficiently performed. Meanwhile, the client obtains from the server the new delta file 465 corresponding to the selected reference file. The reference file copy is then modified based on the instructions in the new delta file (S484) and the result is saved as the new file (S486). If the client does not have an appropriate reference file, the entire new file can be downloaded (preferably, in a compressed data format).

Variations to the above implementations may include the server obtaining the reference file list from the client and selecting reference files based on the reference files already at the client. The server may obtain a new file list of new files needed by the client and determine the new file which needs to be downloaded to the client from the new file list. Reference files may also be provided beforehand to the client using a physical media.

The system server may optionally track the frequency with which each reference file and corresponding new delta file are selected by clients, and reduce the time it spends computing delta files for infrequently selected references. Also, the system server may continuously optimize its reference delta index. For example, the server may perform every possible compression test up front or only test up to a threshold for time or compression ratio. Moreover, the server may wait to generate new delta files until the reference files available on the client are known.

The system server may also use a data compression algorithm to further reduce the size of the new delta file. In one case, a unique or special-purpose data compression algorithm in source or object code can be transmitted for use by the client. In a situation where the client can trust arbitrary instructions from the server, such as in a code sandbox, virtual machine, capability-based program context, secure computing environment, or trusted or cryptographically signed code, the client can use the server-provided instructions to select a special-purpose delta file or a delta file tailored for a data compression technique that the server supports but the client does not (otherwise) support. For example, an administrator finds that a new or unusual compression algorithm (such as SBC) is more efficient with one or more files. She adds this algorithm to the server's "knowledge", and it uses the algorithm to compress one or more files. The client has no previous knowledge of the algorithm, namely how to decompress data stored with that method. The server provides computer instructions to the client such that it can decompress the stored file. This allows the client system to "learn" a new technique without extensive reprogramming of the client system.

System servers and clients may work on any operating system (OS). A server need not be hosted on the same OS as a client, as long as common reference files are available to the server.

The various implementations of the invention are realized in electronic hardware, computer software, or combinations of these technologies. Some implementations include one or more computer programs executed by a programmable processor or computer. For example, in one implementation, the server and the client systems discussed above are computer systems, each of which may include one or more programmable processors, and provide file distribution using delta files through the execution of stored software. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations for an online game service, the system can also be used for the download of other types of data, such as access to audio or video data. Similarly, downloads can be viewed as in-game or out-of-game services, or a combination. Alternative system configurations can also be used, such as distributed processing or storage systems.

Accordingly, the present invention is not limited to only those implementations described above.

What is claimed is:

1. A method of distributing a new file from a server to a client, said client performing the steps of:

sending a request for said new file to the server, said new file configured to execute a particular application;

receiving a reference delta index corresponding to said new file from said server, wherein said reference delta index comprises a list of one or more new delta files and corresponding reference files for said new file resident on said client:

searching the reference delta index for index entries corresponding to reference files that are stored in storage accessible to said client but extrinsic to the particular application;

selecting a new delta file and corresponding reference file based on compression ratio values and said index entries in the reference delta index, wherein the compression ratio value is a measure of the reduction in file size between the new delta file and the corresponding reference file;

requesting and obtaining the selected new delta file from said server; and generating said new file by applying said new delta file obtained from said server to corresponding reference file retrieved from said client.

2. The method according to claim 1, wherein the corresponding reference files for said new file received from the server are reference files that the server determines are likely to be present on the client.

3. The method according to claim 1, wherein said client further performs the steps of:

obtaining a new file list of new files for distribution from said server;

determining said new file from said new file list to download from said server; and requesting said new file from said server.

4. The method according to claim 1, wherein the particular application is a game software, and wherein said reference files that are extrinsic to the game software comprise system files, graphic files, or library files that are not part of the game software.

5. The method according to claim 1 wherein said new file is generated by modifying a copy of the corresponding reference file according to said new delta file.

6. The method according to claim 1, wherein said new delta file is comprised of instructions for changing the corresponding reference file into said new file.

7. The method according to claim 1, wherein reference files are provided beforehand to said client using a physical media.

8. The method according to claim 1, wherein at least one reference file includes data files associated with an operating system file.

9. The method according to claim 1, wherein said server is for an online game system and said client executes client game software to interact with said online game system, said reference files include base files, not provided as part of said client game software.

10. A method of distributing a new file from a server to a client, said server performing the steps of:
receiving a request for said new file from the client, said new file configured to execute a particular application;
selecting reference files from a reference file database connected to said server,
wherein the selected reference files arc reference files that the server determines are likely to be present on said client, but extrinsic to the particular application;
generating new delta files corresponding to the selected reference files for said new file:
generating a reference delta index for said new file;
said reference delta index comprising index entries including a list of one or more new delta files and corresponding reference files:
calculating compression values for the generated new delta files;
said reference delta index further comprising said compression values for said new delta files; and
sending at least one of said new delta files to said client on the basis of said reference delta index;
said new delta file being used by said client to generate said new file.

11. The method according to claim 10, wherein said server further performs the steps of:
sending said reference delta index to said client in response to a new file request for said new file: and
sending said at least one new delta file to said client in response to a new delta file request from said client.

12. The method according to claim 10, wherein said server selects reference files based on a reference file list of one or more reference files that are present on said client.

13. The method according to claim 10, wherein said server further performs the steps of:
obtaining a new file list of new files needed by said client; and
determining said new file which needs to be downloaded to said client from said new file list.

14. The method according to claim 10, wherein said new delta file is comprised of instructions for changing the corresponding reference file into said new file.

15. The method according to claim 10, wherein reference files are provided beforehand to said client using a physical media.

16. The method according to claim 10, wherein said server is for an online game system and said client executes client game software to interact with said online game system, said reference files include base files not provided as part of said client game software.

17. A computer system for distributing a new file, comprising:
a network for transferring files;
a reference file database including a reference file storage system for storing one or more reference files;
a server connected to said reference file database and said network;
said server configured to select reference files from said reference file database, generate new delta files corresponding to the selected reference files for said new file, and generate a reference delta index for said new file, wherein the selected reference files are reference files that the server determines are likely to be present on the client computer, but extrinsic to the particular application;
wherein said reference delta index comprises index entries including a list of one or more new delta files and corresponding reference files;
wherein said new file is configured to execute a particular application; and
a client computer, having a processor, connected through said network to said server;
said client computer configured to, using the processor, receive said reference delta index corresponding to said new file from said server, select a new delta file and corresponding reference file based on a reference file list of one or more reference files resident on said client computer and compression ratio values in the reference delta index, obtain the selected new delta file from said server, and generate said new file on the basis of said new delta file from said server and corresponding reference file from said client computer.

18. The computer system according to claim 17, wherein said client computer further performs a step of generating said reference file list of one or more reference files.

19. The computer system according to claim 17, wherein said client computer obtains a new file list of new files for distribution from said server, determines said new file from said new file list to download from said server, and requests said new file from said server.

20. The computer system according to claim 17, wherein said server sends said reference delta index to said client computer in response to a new file request for said new file, and sends said new delta file to said client computer in response to a new delta file request from said client computer.

21. The computer system according to claim 17, wherein said server selects reference files based on said reference file list of reference files on said client computer.

22. The computer system according to claim 17, wherein said server
obtains a new file list of one or more new files needed by said client computer; and
determines said new file which needs to be downloaded to said client computer from said new file list.

23. The computer system according to claim 17, wherein said reference delta index further comprises compression values for said new delta files and the new delta file is selected on the basis of the compression values.

24. The computer system according to claim 17, wherein said new delta file is comprised of instructions for changing, the corresponding reference file into said new file.

25. The computer system according to claim 17, wherein reference files are provided beforehand to said client computer using physical hardware media.

26. The computer system according to claim 17, wherein at least one reference file includes data files associated with an operating system file.

27. The computer system according to claim 17, wherein said computer system is an online game system and said client computer executes client game software to interact with said online game system, said reference file database includes base files not provided as part of said client game software.

28. The method according to claim 1, wherein the selected reference files are reference files that the server determines are likely to be present on said client.

* * * * *